April 2, 1963 A. M. ZALKIND 3,083,503

LINE FOLLOWER DEVICE, ESPECIALLY FOR TOYS

Filed March 13, 1958 3 Sheets-Sheet 1

INVENTOR.

ALBERT M. ZALKIND,

LINE FOLLOWER DEVICE, ESPECIALLY FOR TOYS

Filed March 13, 1958 3 Sheets-Sheet 2

INVENTOR.
ALBERT M. ZALKIND,

April 2, 1963 A. M. ZALKIND 3,083,503

LINE FOLLOWER DEVICE, ESPECIALLY FOR TOYS

Filed March 13, 1958 3 Sheets-Sheet 3

INVENTOR.
ALBERT M. ZALKIND,

United States Patent Office 3,083,503
Patented Apr. 2, 1963

3,083,503

LINE FOLLOWER DEVICE, ESPECIALLY FOR TOYS

Albert M. Zalkind, Arlington, Va.
(1026 Warner Bldg. NW., Washington 4, D.C.)
Filed Mar. 13, 1958, Ser. No. 721,128
14 Claims. (Cl. 46—244)

This invention relates to toys and more particularly to a device capable of following an arbitrarily drawn, erasible line.

It is an object of the invention to provide means whereby a toy, for example in the form of a dog, can follow a two-dimensional graphic path, which path may be obliterated or erased and a new path drawn as suits a child's fancy.

It is another object of the invention to provide a device simple and rugged in nature and economical to manufacture for simulating the motion of a toy animal, car, etc., which moves in a predetermined manner to follow an arbitrarily drawn line.

It is a further object of my invention to provide tractive means actuated by electric motors wherein gears, pulleys, belts, and even wheels are eliminated.

It is a yet further object of my invention to provide an arrangement wherein battery current is conserved.

Other objects and features of my invention will be apparent from the description to follow.

Briefly, the invention contemplates the use of electrical conductivity wherein feeler means in the form of contacts follow an insulated line placed on a metal surface, or conversely, a metallic and conductive line placed on an insulating surface.

Referring now to the drawing,

FIG. 1 is an elevation of a preferred form of the invention.

FIG. 1*a* is a modification of a certain portion of that form.

FIG. 2 is a front view of the device.

FIGS. 2*a* and 2*b* are detailed views of the motor tip shafts.

Figure 6:
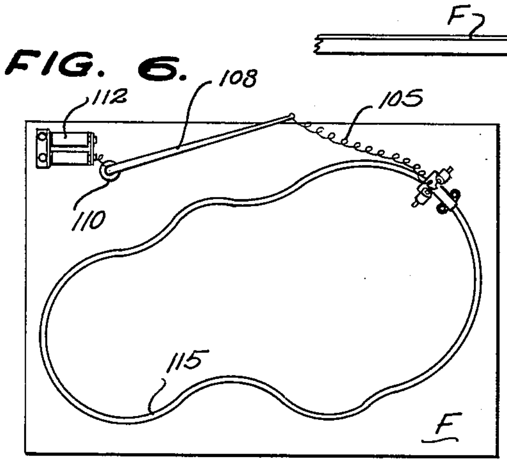
FIG. 6 is a plan view of a third form of the invention.
Figure 6A:
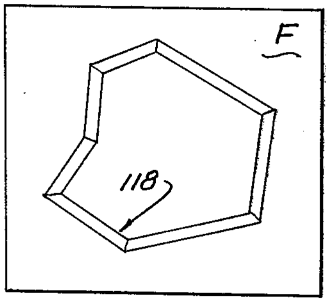

FIG. 6*a* is a plan view of a modified running surface.

Figures 7, 10:
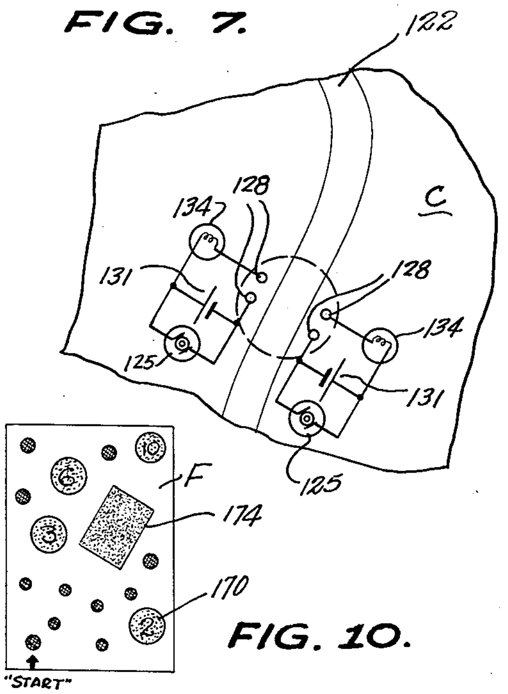

FIG. 7 shows a circuit diagram of a fourth form of the invention, in plan arrangement on an operating surface.

Figure 8:
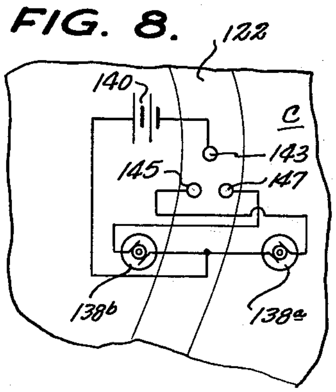

FIG. 8 is a schematic fragmentary plan of a fifth form of the invention.

Figures 1, 1A, 2, 2A, 2B, 3, 4, 9:
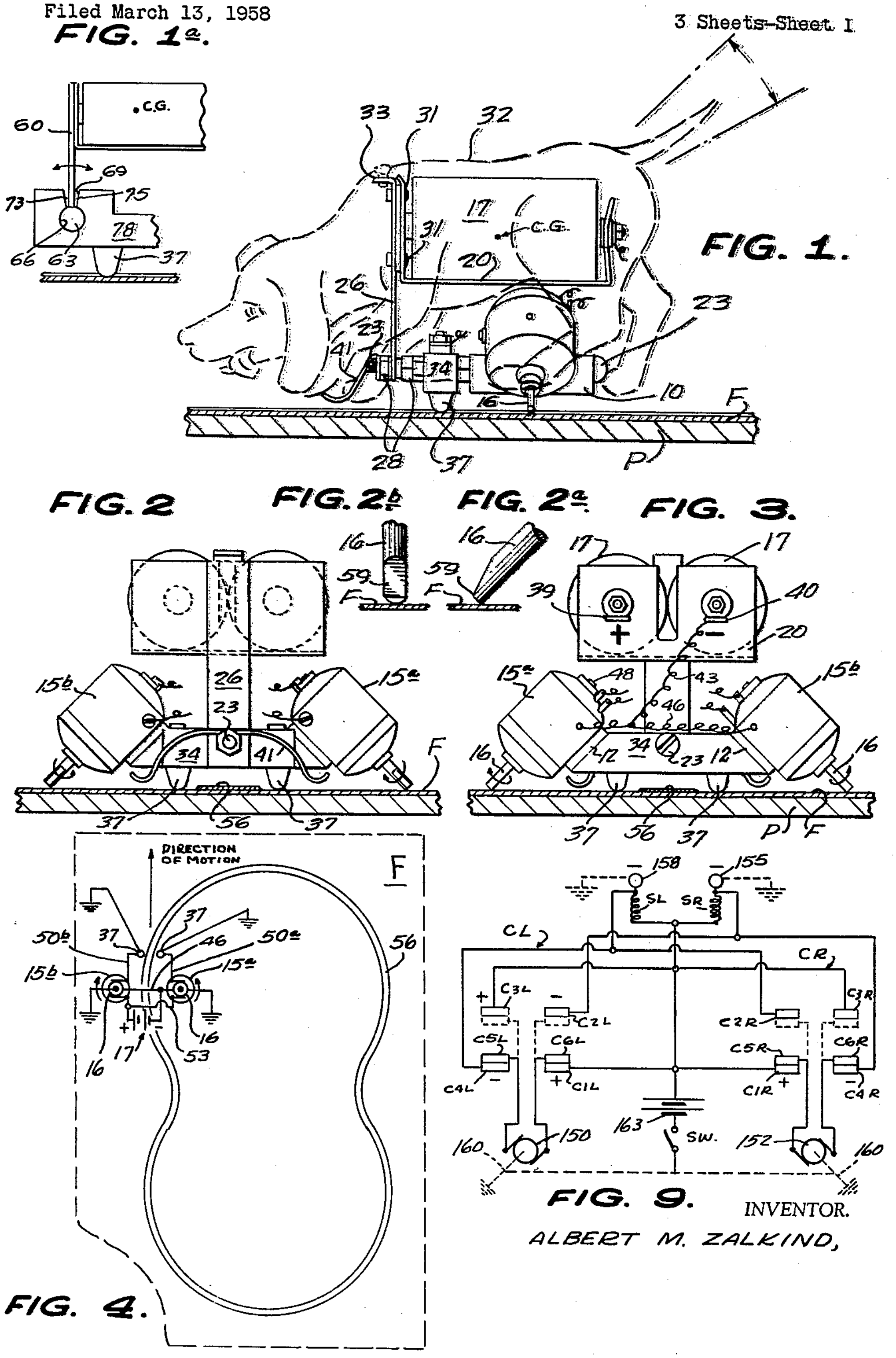
FIG. 3 is a rear view.
FIG. 4 is a plan view showing a conductively surfaced board or plate on which the device operates and disclosing the circuit arrangement of the electrical components of the device.

FIG. 9 is a modified wiring arrangement suitable for use with any of the first three forms of the invention for more precise line following; and FIGS. 10–16*a* are further modifications.

Referring now to FIGS. 1 through 4, wherein is disclosed a preferred form of the invention, there is illustrated a device which comprises a motor mounting base or bracket means 10 having sloped sides 12, each side having fastened thereon a respective small electric motor 15*a* and 15*b*. Each motor has a shaft 16 extending therefrom and engaging a supporting surface F as shown, to be hereinafter described in detail. The motors are preferably of the extremely low cost and simple permanent magnet type operable by ordinary flashlight cells such as the cells 17 which are arranged in series in what may be considered to be a conventional battery holder 20. The bracket 10 in this instance has a centrally located through-bolt 23 which extends outwardly at the front of the device and carries a leaf spring 26, the lower end of which is securely held as by nuts 28 to the through-bolt and the upper end of which is suitably fastened as by rivets 31 to the battery holder 20 to support the battery mass. A light, hollow plastic animal figure, for example that of a bloodhound 32, may be secured in any suitable manner to a bent portion 33 at the upper end of the spring. It will be understood that the dog figure substantially houses the batteries and the motors and gives the impression of a toy animal. Thus, it will be understood that the weight of the batteries is carried flexibly by the spring 26 which may be a short strip of leaf spring material similar to that used for alarm clock springs and which is capable of flexing by virtue of the battery mass being set into vibration. A swivel block 34 is carried by the through-bolt 23 and will be understood to be freely pivotal in a plane normal thereto; the swivel block 34 carrying a pair of spaced contact elements 37 which depend downwardly and rest on the surface F, being slidable thereon.

From the above description it will be apparent that the device is supported at four points; namely, on the contacts 37 and the shaft tips 16. At the forward extremity of the bolt 23 a tip-over guard 41 which may be in the form of a piece of bent wire is provided for a purpose to be hereinafter described.

The surface F is a metallic surface, for example aluminum foil laminated to a cardboard plate P or other support means, the foil surface F thus being conductive.

Referring to FIG. 3, the plus and minus battery lugs 39 and 40 are shown and it will be seen that the negative lug 40 is connected by a wire 43 to a wire 46 which is fastened to the casings of the motors as indicated by the heavy, black dots at the ends of wire 46. It is assumed that the motors are of a type wherein the shafts and the casings are not insulated from each other and accordingly a current path is formed from the negative battery terminal to the tips of the shafts 16 and thus to the foil surface F. I have found that motors of this type are readily available. However, in the course of experimentation with various types of motors I have found that certain makes have their shafts insulated from the casings and accordingly it is necessary to provide a leaf spring contact abutting each shaft (or one shaft at least) to provide a current path to the foil from the battery terminal. For example, such a leaf spring may be provided in resilient engagement with the inner end of each (or one) shaft 16 at the point 48, as seen on FIG. 3. For purpose of simplicity of construction I prefer motors wherein direct conductivity may be had through the casing to the shafts as shown.

The complete wiring diagram has been eliminated from FIG. 3 for clarity. However, by referring to FIG. 4 wherein the lead 46 will be readily identified as connecting the negative of the battery to ground, it being understood that such connection is through the shafts 16 as explained above, the motor terminals (as indicated by the curlicue wires in FIG. 3) are connected so that each motor has a terminal connected to a respective contact 37 via a lead 50*a*, or *b* while the other terminals of the motors are connected together and to the positive of the battery, as by a lead 53. The circuit is of a very elementary nature, as will be readily appreciated from FIG. 4.

Drawn on the surface F as shown on FIG. 4 may be an arbitrarily designed path 56 in crayon, wax, enamel, paint, etc., or any other medium which serves to provide a suitable degree of insulation. In any event, the path is substantially of a two-dimensional nature and may be readily erased by any abrasive pad such as a scouring pad of plastic or copper mesh, or steel wool, and redrawn in any manner which suits a child's fancy. I have found masking tape or Scotch tape likewise suitable for making the path, but it is not as suitable for curvilinear configuration as ordinary crayon. Further, it is considerably more expensive and finally it does not have the dramatic and play value effect as a graphic line. As viewed on FIG. 3 the path 56 is shown with exaggerated thickness. However, it will be appreciated that it is substantially but a few thousandths of an inch thick and has no appreciable vertical depth which would in any way serve as a guide.

The contacts 37 straddle the path 56 being disposed on respective opposite sides thereof and spaced slightly therefrom. From the circuit diagram of FIG. 4 it will be apparent that when the device is placed on a metal surface current will run from the negative battery terminal to the surface through the motor casings and shaft tips and thence to the contacts 37 to the respective motors and finally from the motors to the positive terminal of the batteries. Accordingly, the motors will operate. The motors are connected so that they rotate in opposite directions as indicated by the arrows and it will be appreciated by virtue of the slanted position of the shafts that the net effect will be forward driving in an upward direction as viewed on FIG. 4 with respect to the bottom of the drawing, and toward the reader with respect to FIG. 2, and away from the reader with respect to FIG. 3.

In order to improve traction of the shaft tips they are preferably provided with a ground flat bevel portion as shown in FIGS. 2*a*, 2*b* which leaves an edge 59 at the outer extremity that digs into the conductive surface and expedites locomotion. Preferably the shaft tips should be hardened to retain permanency of the edge 59 or a hardened cap not shown having the general shape shown in FIGS. 2*a* and 2*b* may be slipped over the shaft tips by force fit.

From the description thus far given, the operation will be understood to be as follows:

Considering FIG. 4, both motors being energized, the device moves forward until either the left or right contact 37 strikes and rides up on the insulated line 56. This breaks current continuity to the motor associated with that contact 37 and, accordingly, that motor stops rotating. However, the other contact 37 is still passing current to its respective motor which remains energized and the net effect of one motor being dead and the other motor continuing to rotate is to swing the device more or less around the shaft of the dead motor, serving as a pivot, in a direction to move the contact which had ridden up onto the line 56 off the line. The action is completely reversible. If the contact rides up on the line its associated motor is deenergized, the other motor continues to rotate, and thus steers the device in a direction so that its own contact approaches the line, but before striking it, the first contact has been removed from the line and its associated motor has become energized once more. Thus, both motors are normally energized, de-energization of either one occurring when its associated contact rides up on the line, whereupon selective de-energization effects a steering function and the device faithfully follows the line. The action is accompanied with some hunting as the contacts, in going forward, also move somewhat from side to side, depending upon the nature of the curvature of the line. At any rate, the resultant motion is to follow the path 56 in complete circuit.

I have found throughout the course of my experimentation from a standpoint of practical toy construction and operation that the insulated line, when drawn in a crayon color, may be anywhere from a quarter to five-eighths of an inch wide and the contacts 37 spaced so that they are about an eighth of an inch or so from respective sides of the line. I have further found that very effective contacts which have a minimum wax pick-up are small, spherical surfaces of the order of about one-eighth of an inch in diameter and having any hard, shiny plating.

Referring to FIG. 1 it will be noted that the battery mass is set well forward with respect to the mass of the motors so that the center of gravity of the batteries is in a position with respect to the center of gravity of the motors to have a lifting effect on the motors should the batteries rock counterclockwise as viewed on FIG. 1. This counterclockwise (and return) rocking of the batteries actually occurs due to any vibration set up as the toy moves and has the following beneficial effects:

(1) When the batteries are fresh, the toy may have a tendency to over-speed (depending on weight and friction with the surface on which it operates) and in the case of such over-speeding it may shoot past the graphic line at a bend. The oscillation of the battery mass lifts the weight of the motors off the shaft tips to an extent that tractive effort is minimized or reduced to zero. Thus, the shaft tips are unloaded of weight and the toy slows down or stops dead. In other words, tractive effort is in a series of pulses, two or three or more per second, depending on the design of the device, which act as speed governors so that the toy will not have so much momentum that it will overshoot the line at a curve.

(2) The small permanent magnet motors used with such a device are very inefficient and draw surprisingly high current. The periodic unloading of the shafts permits the motors to speed up as weight is lifted off of them and the annular momentum built up in the armatures of the motors is converted into forward thrust on each return movement of the battery mass, even when the batteries are worn.

(3) The entire toy is given a to and fro rocking motion which is very realistic of animal motion and highly advantageous in a toy, since it lends considerable interest in watching the operation.

The shaft tip extremities may actually leave the surface of the foil on each forward swing of the batteries, but this does not affect operation. Usually the shafts have endwise play, so that tip engagement is maintained. If a leaf spring contact, bearing against shaft ends 48 of the motors, is used, then contact is virtually constant.

Inherent in the circuitry is the fact that as either motor cuts out, there is surplus power available for the other motor (the motors being in parallel) and thus the live motor speeds up to all the more promptly serve the device to follow a curve.

It will be appreciated that the shafts will rotate with slippage in the operation of the toy, but that does not matter inasmuch as the average speed of the toy is suitable for practical purposes. The slippage of the shafts permits the toy to generate counter electromotive power so as to keep the running current down.

I have found that the swivel block 34, being rockable in a vertical plane normal to the plane of the paper as viewed on FIG. 1, or parallel to the plane of the paper as viewed on FIG. 2, is very effective in maintaining contacts 37 in intimate engagement with the running surface F, even though there may be unevenness or irregularity in the surface. Of course, the contacts 37 could be mounted on individual leaf springs for that purpose, but a simpler expedient is believed to be the swivel block. It should be noted that the position of the battery mass is such that a large amount of the weight of the batteries is carried by the contacts 37 to insure full contact with the surface F. Further, I have found after much experimentation that a highly satisfactory form of contact is a small, chrome-plated or nickel-plated spherical surface such as shown at the lowermost extremities of the contacts, probably of the order of one-eighth inch in spherical diameter. This form of contact has high unit stress against the surface F to maintain good electrical conductivity therebetween, while at the same time picks up little or no stray wax from engagement with the crayon line 56, and yet is easily slidable.

Concerning the crayon line 56, it will be appreciated that the line need not be continuous, providing the motors are reasonably synchronized. In other words, the line could be a series of short lines, although curves would preferably be continuous. However, I have found that, as a practical matter, the small permanent magnet motors used are in no way synchronized and, accordingly, a continuous line is used.

It should be further noted that lack of synchronization of the motors, which would tend to produce a curved travel of the toy under control of the faster running motor, would be compensated for by the contact which controls that motor swinging into engagement with the insulated line, thereby cutting that motor out and thus permitting the other motor to straighten out the path of travel of the toy.

While I prefer the simple sliding contacts 37, it will be appreciated that small, rolling metal wheels would be usable. However, I have found that better contact is made by the small spherical area which affords high unit stress. While I have disclosed the use of soft-surfaced aluminum foil as the running surface, the toy will operate on any suitable conductive surface, such as sheet metal, etc. Further, the slope of the shafts is not critical and any reasonable slope, which will not put too much bending strain on the shafts due to too low an angle, nor reduce the forward thrust engagement of the shaft tips with the board to a point where there is no traction due to too high an angle, is suitable. I have found the toy operable with slopes that vary from as low as 20° to as high as 70°, but quite likely slopes outside even that large range could be used. Further analysis of the toy indicates that any type of light, plastic body could be used; for example, a bucking bronco, which might be attached at any one of several points, such as at the forward or rearward end of the through bolt 23 or at the top of the spring 26, as shown.

Also, instead of using a line made by a fully insulating medium such as crayon, a different medium might be used which would produce a line having a certain amount of resistance; for example, a mixture of wax and graphite in suitable proportion, considering the low voltage used in the device, wherein the motor which engages the line does not stop completely, but is materially slowed up. Alternatively, the board surface could be of a relatively high resistive material, such as German silver, while the graphic line could be of a relatively high conductive material producable by some types of paints and inks, or even a foil ribbon cemented to the board. Such an arrangement would likewise control the motors wherein the contacts would speed up their respective motors, upon engagement with the relatively high conductive line. In such case, the leads 50*a* and 50*b*, as shown in FIG. 4, would be crossed over to control the motors 50*b* and 50*a* respectively, so that that motor would be speeded up, which would tend to bring the device back into line following condition.

Concerning the oscillatory function of the battery mass, it will be noted that the center of gravity of the mass is placed forwardly of the center of gravity of the motors, the balance being arranged so that oscillation is readily set up by ordinary vibration produced by running of the toy. While I prefer to mount the battery mass on the flexible spring 26, which gives a regular period to the oscillations and also makes the battery mass more sensitive to vibration, while at the same time reducing the need for critical positioning of the battery mass with respect to the motor mass to produce an over-balance on forward swing of the batteries, it should be noted that the use of a spring mount is not absolutely critical. In other words, from a theoretical standpoint, the batteries could be mounted at a very critical balancing point with a rigid mount and would still effect lifting of the motor shafts to produce the pulsing, tractive effort and the other effects. Of course, in such event, the tip-over guard 41 or some equivalent device, would probably be required to prevent the toy from falling over on its nose, assuming the head of the toy animal did not serve such a function. Further, a less critical balancing of the battery with respect to the motors could be had by virtue of the arrangement shown in FIG. 1*a* wherein the batteries will be seen to be carried on a rigid bar 60 secured in a pintle 63 freely rotative in a cylindrical socket 66, and wherein the bar 60 extended upwardly and had a certain amount of free play within a slot 69 having slightly slanted sides 73 and 75. The construction could be carried in a block 78 formed as an extension of the contact carrying block, as indicated by the contact 37 connected thereto. In such case, of course, the through bolt would not extend entirely through the block 78 to the point where it would interfere with pintle 63.

Other forms of the invention will be apparent from the disclosure to follow.

Figure 5:
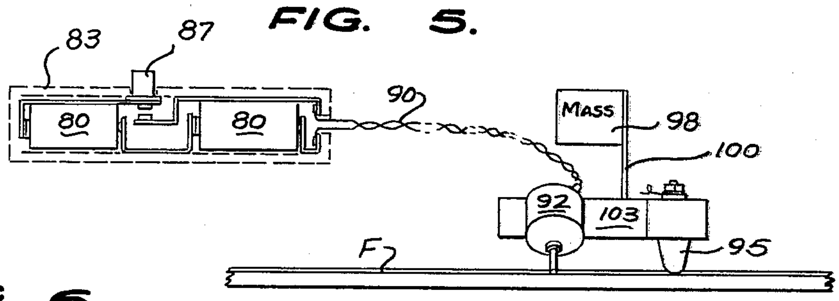
FIG. 5 is another form of the invention in elevation.

In FIG. 5, two batteries 80 are shown connected in series within a hand-held casing 83, wherein the casing has a finger-depressible switch button 87, all of conventional structure as heretofore used in conjunction with electric toy vehicle. A pair of very light wires 90, which may be considered as a dog leash, extend from the casing to the toy, and it will be understood that connections are made to the motor 92 and contacts 95, precisely as shown for the same components in FIG. 4. In this instance, a mass 98 which may be metal, sand, or cement, etc., is carried on a flexible leaf 100 secured to the body 103 of the device to produce an oscillatory motion, all as heretofore explained in considerable detail. In this instance, in view of the fact that the battery mass is not carried by the device, the mass 98 may be disposed at a suitable point intermediate the motors and the contacts although, of course, it will be appreciated, depending on the dimensions and weights involved, that the mass could be located forwardly of the contacts as in FIG. 1 with the center of gravity intermediate the motors and the contacts, or even ahead of the contacts. Details, such as the tip-over guard, etc., have been eliminated from FIG. 5 for clarity, inasmuch as it will be understood that the toy is entirely operable, as I have found from experimentation, on a board F, identical to the board F of FIG. 1.

Referring to FIG. 6, an arrangement somewhat similar to that shown in FIG. 5 is shown, wherein the device itself may be the same as that shown in FIG. 5. The twin wire cable 105 is secured at the outer free end of a boom 108 universally mounted in any conventional manner at 110. Cable 105, of course, connects to a pair of batteries in series, as shown at 112, and the toy runs around an insulated line 115 on the board F. The battery arrangement 112 may be carried on the board F and is stationary.

In conjunction with FIG. 6*a*, an arrangement of masking tape 118 is disclosed consisting of separate pieces of tape abutting end to end and either slightly overlapping or having the ends angularly cut to match each other. The device will follow such a line very readily, as I have found from experimentation. The tape may be peeled off and used in various irregular arrangements. Short pieces of tape may be utilized to make a fair approximation of a curved line, as will be readily understood.

Attention is now invited to FIG. 7, wherein a form of the invention is shown which utilizes an insulating surface C of, for example, smooth, calendered cardboard whereon is fastened a path 122 of ribbon foil. Other conductive paths may be used, such as a heavily conductive, wax-like crayon, paint, or ink. In this modification both motors 125 are run simultaneously, as in the other modifications, but when the contacts 128, of which each motor is provided with a pair, engage the conductive line 122, the respective battery 131 is shunted by the lamp 134 which drops the voltage for that motor below the voltage cut-off point and thus stops the motor, while the other motor is still running. Or the current from the shunted battery is dropped to a point that it materially slows down the respective motor. Thus, each system consists of a pair of contacts, a motor, a battery, and a lamp, all wired in parallel except for the series connection of the contacts, the systems being independent of each other. It will, of course, be understood that the physical structure can be identical to that shown in FIG. 1 except that four contacts are carried by the swivel block instead of two, the contacts being arranged in tandem pairs so that each pair will engage the conductive line 122 substantially simultaneously.

In FIG. 8 another arrangement is shown for following a conductive line 122 on an insulated board C consisting of the motors 138*a* and 138*b*, the battery 140, and three contacts arranged generally in a triangle 143, 145, and 147. In this arrangement the negative of the battery is grounded through forward contact 143 and the positive of the battery connects to corresponding terminals of the motors. The motor 138*a* is controlled by the contact 145 while the motor 138*b* is controlled by the contact 147. The contact arrangement is such that all three contacts are in sliding engagement with the conductive line 122, but the rear contacts 145 and 147 are spaced somewhat so that either of them can go off the line. When this happens the motor which it controls stops and the motor, still running, swings the toy back to the line. Thus, as contact 147 goes off the line at the bend shown, motor 138*b* stops, but motor 138*a*, its contact 145 still engaging the line, continues to run, and thus swerves the toy toward the line to negotiate the curve. The mode of operation mechanically is the same as the hereinabove disclosed for FIG. 1, as is the physical structure.

Referring now to the circuitry shown in FIG. 9, the arrangement is such as to provide for a very precise control for line following and one which might be too expensive for use in toys, but might have application industrially. In this arrangement each motor is provided with a double pole, double throw relay so as to effect reverse rotation of the motors when its contact engages the insulated line. Thus, with one motor running forwardly and the other motor running reversely, the steering action is analogous to rowing a boat wherein one oar is pushed and the other oar is pulling. Such a boat practically swivels on a very short turning radius. In this modification each motor pushes or pulls its respective side of the toy as distinguished from other modifications hereinabove disclosed wherein the shaft of the dead motor serves more or less as a pivot point. The circuit arrangement provides the usual motors 150 and 152 having respective cross-over contacts 158 and 155, wherein the motor bodies are grounded through their shaft tips 160 (as explained in conjunction with FIG. 1 above). A battery 163 is provided, the negative terminal being grounded through the motor bodies and the shaft tips, and the positive terminal being connected to a stationary contact $C_{1R}$ and $C_{1L}$ of each of the relays $C_L$ and $C_R$ and also to the stationary contacts $C_{3L}$ and $C_{3R}$. The battery positive is also connected to one end of the solenoids $S_R$ and $S_L$ of the respective relays shown. The other ends of the solenoids are connected to respective contacts 155 and 158. Thus, the solenoid $S_R$ controls the right-hand motor 152 and the solenoid $S_L$ controls the left-hand motor 150. The contact 155 is connected to the stationary contact $C_{4R}$ and also to stationary contact $C_{2L}$, while the contact 158 is connected to the stationary contact $C_{4L}$ and stationary contact $C_{2R}$. The moving contacts $C_{5L}$ and $C_{6L}$ are connected to the terminals of the motor 160 and similarly the moving contacts $C_{5R}$ and $C_{6R}$ are connected to the terminals of the motor 152.

The relays are such that, when de-energized, contact is normally open between $C_{5L}$—$C_{4L}$ and $C_{6L}$—$C_{1L}$ (although shown as closed in FIG. 9) and likewise normally open between $C_{5R}$—$C_{1R}$ and $C_{6R}$—$C_{4R}$, while being normally closed at $C_{5R}$—$C_{2R}$, $C_{6R}$—$C_{3R}$, $C_{5L}$—$C_{3L}$, $C_{6L}$—$C_{2L}$. The position shown in FIG. 9 for the relay contacts obtain when the solenoids $S_L$ and $S_R$ are energized. Thus, as shown in FIG. 9, the toy is assumed to be on the metal running surface and in operation, both solenoids are energized since they are connected to their respective contacts 155 and 158, in which case the relay contacts are positioned as shown. Accordingly, the left-hand terminal of motor 150 is negative and the right-hand terminal is positive. The connections set up by $C_R$ make motor 152 positive at the left-hand terminal and negative at the right-hand terminal. The connections to the motors are assumed to be such that both motors are operating in the proper direction to produce forward motion in unison.

It will be noted that the motors are connected in parallel as in previous modifications. In this arrangement, however, since both motors are operating at all times, either motor going in one direction or the other, the drain on the battery is constant or fairly constant, whereas in prior modifications, when one motor cut out, there was excess battery current available for the other motor to give it a considerable speeding up effect. Accordingly, in this arrangement it is probable that batteries somewhat larger than ordinary flashlight cells will be required for longevity. The operation is as follows:

Assuming contact 155 engages the insulated line, relay $S_R$ is de-energized. Contacts $C_{5R}$ and $C_{6R}$ break engagement with $C_{1R}$ and $C_{4R}$, respectively, thus producing the normally open position at such contacts, and engage, as shown in the dotted lines, with contacts $C_{2R}$ and $C_{3R}$, respectively. In such case, the right-hand terminal of motor 152 is now positive and the left-hand terminal is now negative. Accordingly, motor 152 reverses, and remains reversed until contact 155 is shifted off the insulated line, back to the metal surface, once again energizing solenoid $S_R$ and the full line position of contacts $C_{5R}$ and $C_{6R}$ is restored to the position shown in FIG. 9, whence motor 152 runs forwardly once more.

The precise operation is obtained by relay $C_L$, that is energization or de-energization of solenoid $S_L$, depending upon whether or not contact 158 is off or on the insulated line, producing forward or reverse rotation of motor 150.

Accordingly, the motors, by having simultaneous forward or individual reverse rotation, will effect very quick and precise steering control.

In FIG. 10 is shown a conductive surface F having insulated spots which may be produced by paint or crayon, such as the spot 170, this disclosure being along the lines of description found hereinbelow for utilizing the invention for chance game purposes. Thus, it will be noted that the insulated spots are provided with numerical scores, the general idea of the game being to start the toy at one corner of the board, for example as shown by the arrow designated as "Start" and permitting it to run haphazardly, being controlled by chance engagement of the contacts with insulated spots. Should either contact strike one of the numerical score spots, such score is to the credit of the player operating the toy at that time, and the numerical quantities at the time the toy reaches a non-operating position, by running off the board or possibly running into a very large insulated spot which will de-energize both contacts, such as the spot 174, are totalled.

It will further be appreciated that the traction means, that is the use of shaft tips in the novel arrangement shown for the purpose of propelling the toy, while extremely economical, is not absolutely essential. A more expensive arrangement, and one with which I have experimented, would be the use of small rubber wheels geared to the motors. I have found, however, that such arrangements are in no way superior to the tractive means hereinabove disclosed and, as a matter of fact, the friction losses in the gears consume considerably extra current. Of course, the same vibratory arrangement of the battery mass is usable with a geared wheel drive since there is sufficient vibration in such an arrangement to maintain oscillation of the battery mass. In any event, wheels having one or more flats thereon could be utilized to insure vibration, spaced flexible leaf springs for ground contact being utilized.

Figures 11, 12, 12A, 13, 13A, 13B, 14, 14A, 14B, 15, 16, 16A:
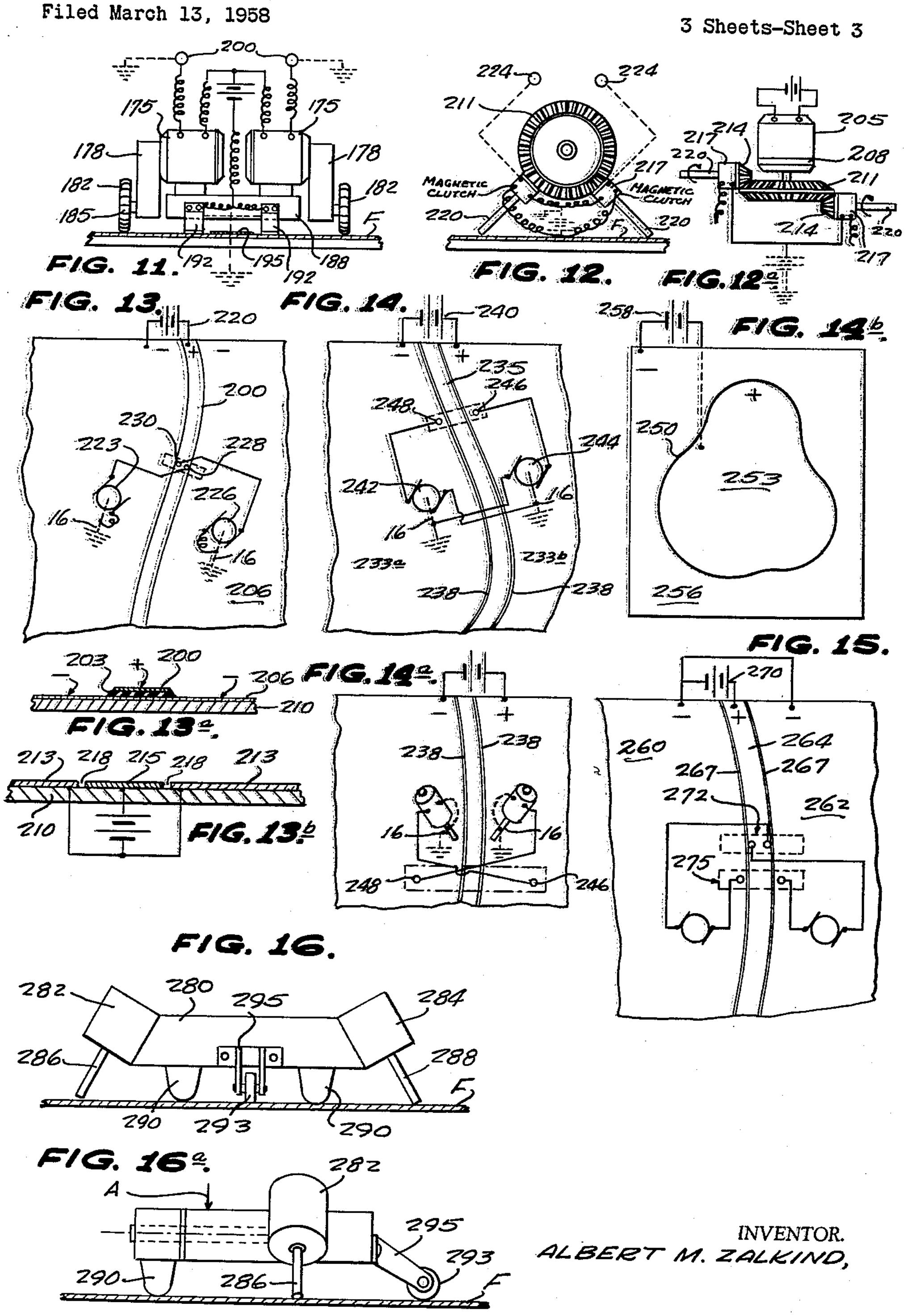

Referring to FIG. 11, an arrangement is shown which utilizes a pair of motors 175 which, operating through respective suitable reduction gearing 178, rotate a pair of small respective rubber wheels 182, preferably provided with one or more flat surfaces, such as 185. The motors are mounted on a base 188 which also carries a pair of flexible spring leaf contact elements 192. The contacts 192 are suitably spaced so as to straddle the insulating line 195 in order that one contact or the other will always be in conductive connection with the metallic surface F. The elements 192 will be understood to be flexed rearwardly so as to drag on the surface F with a certain amount of resilient engagement. The circuitry is the same as for FIG. 1 in that the negative of the battery is grounded through the contacts 192, while the positive is connected to one terminal of each of the motors. The other terminal of each motor goes to the respective forward sensing contact 200.

This modfication may be utilized either with the batteries carried by an oscillatory mount on the motor support 188, or an oscillatory equivalent mass used, as heretofore described in conjunction with other modifications.

Another form of the invention is shown in FIGS. 12 and 12*a*, wherein a single motor 205 is utilized which rotates through suitable gearing 208, a double-face bevel gear 211 for rotating a pair of pinions 214. The pinions are disposed for engagement with a respective face of a bevel gear so that they rotate in the same direction. Each pinion is coupled through a respective magnetic solenoid 217 to a drive shaft 220.

In this arrangement the solenoid clutches are normally energized and in engagement, but are disengaged when the respective contact 224 for either clutch engages the insulated line. The circuitry arrangement is, in every way, similar to that heretofore described, the negative of the battery being grounded through the magnetic clutch casings and the shafts to the foil surface F while the positive of the battery goes to one terminal of each clutch. The other terminal of each clutch is connected to respective sliding contact 224. Accordingly, when contacts 224 are both conducting, the shafts 220 rotate to drive the toy. If, however, either clutch cuts out, its respective shaft stops while the other shaft is still rotating, thus following the line, all as hereinabove described.

The power for the electric motor 205 may come from the same battery, or a separate battery may be utilized. Obviously the motor is continuously rotating.

This modification may be utilized in conjunction with an oscillatory mass, in accordance with the teachings herein.

In connection with motive means, it should be noted that the principle of following a readily erasible, insulated line is not restricted to the use of electric motors. Clockwork motors, or even small toy gasoline motors, could be used, each having a separate shaft clutch operated by a respective solenoid controlled precisely as the shafts of the above disclosure are controlled; namely, by cutting in one or the other, or both clutches, to effect line following.

In FIGS. 13 and 13*a* is shown an arrangement wherein the toy follows a conductive ribbon or surface 200 mounted insulatedly as by a coating 203 about .001" thick on a metallic surface 206 laminated to an insulated base 210. As shown in FIG. 13*b*, a simpler arrangement, involving a metallic surface 213 mounted on the base 210 and having a path 215 cut therefrom as by narrow slits 218 so that the path 215, corresponding to ribbon 200, is insulated from the other portions of the conductive surface.

In either instance, the operating surface consists of a large conductive area on which is a track comprising a conductive strip or ribbon. The track may be either mounted on the conductive barrier or co-planar therewith. A battery 220 is connected to the area 206 and to the conductive strip 200, as shown in FIG. 13. In the event that the board of FIG. 13*b* is used, the battery would, of course, be connected between the strip 215 and the two areas 213. Thus, the conductive strip in either case is connected to one terminal of the battery, while the remainder of the conductive board is connected to the other terminal, regardless of whether the remainder of the conductive board is in a single piece, or is a two-piece arrangement.

The device shown symbolically in this instance consists of a pair of motors 223 and 226, having the usual rotating traction shafts operating on the larger conductive surface, such as 206 or surfaces 213, which shaft is connected in each case to a terminal of the motor. The other terminal of the motors are cross-connected to the contacts 228 and 230, as shown. The contacts may be considered as carried in a swivel block shown in dotted outline, all as hereinabove disclosed. From study of FIG. 13 it will be seen that when the contacts 228 and 230 are on the conductive path 200 both motors will operate and push the toy forward. However, should either contact go off the line, the motor to which it is connected stops rotating and the other motor keeps rotating. In view of the cross-connections, it will be apparent that the operating motor will steer the device back to track the conductive path.

In FIG. 14 is shown an arrangement in which the toy can follow an insulated path or a metallic strip which is not connected to either terminal of the battery. Thus, a metal foil surface may be divided into areas 233*a* and 233*b* by a ribbon-like path 235 which path may be foil removed from the integral sheet, presumed to be mounted on an insulating board. Such removal may be by a sharp-bladed knife or other means. Alternatively, the path 235 may merely be electrically isolated from the areas 233*a* and 233*b* by slitting along the lines 238. The battery 240 is connected to the sections 233*a* and *b* as shown.

The toy comprises the motors 242 and 244 having the traction shafts contacting respective areas 233*a* and 233*b* wherein each motor has a terminal connected for ground contact with a shaft of the other motor, as shown. The remaining terminal of each motor is connected to the respective forward contact 246 or 248, wherein the contacts are carried in a swivel block indicated by the dotted line.

In this arrangement, when the forward contacts are on their respective surfaces 233*a* and *b*, the motors are operative. When, however, either contact strikes the electrically isolated path 235, its respective motor stops and the other motor continues to rotate, thereby swerving the toy into following the path.

It will be noted that each motor is connected across the surfaces 233*a* and 233*b* by virtue of the crossed connections to the rotating traction shafts. In a construction of this type, the traction shafts may require further spacing, with respect to their tips, to insure constant contact with their respective conductive surfaces, since obviously if either traction shaft engages the non-conductive path 235 the opposite motor will stop and the toy will reversely steer. However, it would be theoretically possible to use direct, instead of cross, connections for grounding the motor terminals, in which case the rotating shafts would be the sensing elements instead of the contacts 246 and 248. In that case the sliding contacts would preferably be rearwardly disposed so that the shafts of the motor, preferably set close to each other by inward slanting, would more accurately control the toy. Of course, the contacts 248 and 246 would then be spaced further apart in a swivel block so that they would be in constant contact with their respective foil surfaces and there would be no need for a swivel block. The circuit arrangement is shown in FIG. 14*a*.

In FIG. 14*b* an alternate arrangement for the operating surface is shown. In this case a slit 250 isolates an inner area 253 from a surrounding area 256 of a foil surface. It is presumed that the foil is mounted on an insulating board. A battery 258 has its terminals connected to respective surfaces 253 and 256, the connection to the surface 253 being below the foil surface so as not to impede the progress of the toy. Thus, an opposite polarity of the areas 253 and 256 is effected and the toy will follow the slit 250.

In conjunction with this form of the invention it should be noted that theoretically the circuitry of the toy as shown in either FIG. 14 or FIG. 14*a* could be utilized in conjunction with an erasable, insulating line. However, I have found that the spinning shafts of the motors cut right through such a graphic line, even where the line is enameled. Accordingly, the circuit for either motor would not be broken where cutting through occurred. Therefore, as a practical matter for the circuits shown in FIGS. 14 and 14*a*, a non-conductive path is required which will remain non-conductive regardless of any abrading effect of the motor shafts.

In FIG. 15, an arrangement is shown having a conductive operating array of surfaces comprising the two negative areas 260 and 262 which bound a positive potential path 264, such an area being easily obtainable by mounting foil on an insulating board and isolating the path 264 as by slits 267. The battery 270 is connected as shown to effect the polarity of the areas as described.

In this case the toy has two pairs of forward contacts, each pair being mounted in its respective swivel block, as indicated by dotted lines. Thus, the forward pair of contacts 272 are cross-connected to the motors as shown, while the rearward pair of contacts 275 are directly connected. The motor shafts in this case do not conduct any current.

In the circuitry shown, should either forward contact leave the positive potential strip 264, it will enter a negative potential area and that motor will stop. However, such stoppage is momentary, depending on the spacing of the rearward contacts 275, for the reason that continued motion of the toy will result in the rearward contact engaging the positive potential path 264. In such case the condition is that the contacts for that motor are now negative and positive areas, but are reversed in potential. Thus, the motor will reverse.

Accordingly, by suitably spacing the rear contacts 275 with respect to each other so that as soon as either forward contact leaves the positive path 264, its rearward contact will very quickly engage that path, and connected reversal of the motor will result. In view of the reversal of that motor, instead of merely stopping, very sensitive and precise tracking of the positive path 264 will be effected.

In the form of the invention shown in FIGS. 16 and 16*a* an alternative mode of providing for periodic weight unloading of the motor shafts is illustrated. Thus, the motor mount block or bracket 280 carries the motors 282 and 284 having traction shafts 286 and 288, respectively, all as heretofore described in conjunction with FIG. 1. In this instance, however, the batteries (not shown) may be carried in a rigid mount connected to the mount 280, suitably disposed so as to effect proper downward pressure on the forward sliding contacts 290, such pressure being indicated as generally shown in the area by the arrow A. Periodic weight unloading of the motor shafts is effected by a small eccentric wheel 293 carried in a bracket 295 at the rear of the block 280 and disposed with respect to the shafts 288 in a longitudinal direction so that rolling of the wheel 293 will have a lifting action in each revolution, favored by a predetermined amount of leverage, depending on the distance between the center of the wheel and the motor shafts.

As a practical matter, the mass of the toy, in going forward, has a certain amount of momentum so that the wheel will revolve off its high point to bring the shafts into full tractive effort periodically with the operating surface F. In other words, the toy will not be stalled due to lessening tractive force as weight is lifted off the motor shafts by the wheel.

Other arrangements for periodic unloading of the motor shafts are possible; for example, a third motor could be utilized to rotate the eccentric wheel 293, or either operating motor 282 or 284 could be made slightly larger so as to effect a somewhat greater torque, and this motor utilized to rotate the wheel 293. Alternatively the motors 282 and 284 could be made the same size and a small resistor inserted in the circuit of either motor while the other motor is geared to the wheel 293. The resistor serves to maintain the same general r.p.m. of the motor shafts by cutting down the current for that motor not used to rotate the eccentric wheel.

Having thus described my invention I am aware that various changes may be made therein without departing from the spirit thereof, and accordingly I do not seek to be limited to the precise illustrations herein given except as set forth in the appended claims.

I claim:

1. In a line following toy, means comprising a conductive surface having a common electrical polarity and having an insulating path of predetermined curvature carried thereon, a vehicle for following said path comprising electrically controlled steering means, contact means connected thereto for effective selective control of said steering means to effect steering of said vehicle, said contact means comprising respective conductive elements spaced so as to normally straddle said path when said vehicle is following a straight course and operative to conduct current from said common polarity surface means to said steering means in response to engagement of said contact means with said surface, or to cut off current when engaged on said insulating path in such manner as to wholly break contact with said surface, said steering means being thus selectively controllable depending on current flow through respective contact means as determined by the curvature of said path.

2. A toy as set forth in claim 1, said insulating path being comprised of a readily erasable, wax-like composition.

3. In a line following toy, a metallic surfaced means having an insulating path of predetermined curvature carried thereon, a vehicle for following said path comprising electrically controllable steering means, conductive contact elements electrically connected to said steering means for effecting control thereof, said contact elements comprising at least one pair of such conductive elements spaced so as to normally straddle said path and be in electrically conductive engagement with said metallic surfaced means, said latter means being connected to a current source whereby current is transmitted simultaneously through said conductive elements and whereby, when either of said conductive elements moves onto said insulating path in such manner as to wholly break contact between such element and said metallic surface means, conduction through said conductive element ceases while conduction through the other conductive element continues, and means whereby said differential conduction effects said control of said steering means, and means for providing a return path for current to said steering means.

4. In a line following toy, a metallic surfaced means having an insulating path of predetermined curvature carried thereon, a vehicle for following said path comprising electrically controllable steering means, conductive contact elements electrically connected to said steering means for effecting control thereof, said contact elements comprising at least one pair of such conductive elements spaced so as to normally straddle said path and be in electrically conductive engagement with said metallic surfaced means, whereby current may be transmitted through said conductive elements to said steering means, and means operative in response to either of said conductive elements engaging said insulating path in such manner as to wholly break contact between such element and said metallic surface means to effect control of said steering means to steer said vehicle in a direction dependent upon engagement of a respective sensing element with said path.

5. In a device as set forth in claim 4, said insulating path being of a removable insulating material adhering to said metallic surfaced means.

6. A line follower device comprising a board means having a path means delineated thereon, said board means and said path means having surfaces electrically isolated from each other, and forming a switch arrangement, the surface of at least one of said means being conductive, a vehicle movable on said board means having motor means and having a pair of conductive sensing elements for control of said motor means which are disposed for individual engageable and disengageable relationship with said path means wherein engagement or disengagement depends on the direction of said path means with respect to the direction of motion of said vehicle at any particular point as said vehicle moves on said board means, said sensing elements being normally operative to control current to said motor means, and means responsive to the engaged or disengaged relationship of either of said sensing elements to said path means operative to control said motor means to effect motion direction of said vehicle to follow the direction of said path means.

7. In a device as set forth in claim 6, each of said sensing elements having an area of conductive contact less than the transverse width of said path means.

8. In a device as set forth in claim 6, said path means being a readily removable line effected with an insulating material and said board means having a conductive surface.

9. In a device as set forth in claim 6, each of said sensing elements having an area of conductive contact less than the transverse width of said path means, said path means being a readily removable line effected with an insulating material and said board means having a conductive surface.

10. In a device as set forth in claim 6, said path means comprising a metallic ribbon.

11. In a device as set forth in claim 6, said path means being a graphic line applied with a material of readily removable insulating composition.

12. A device as set forth in claim 6, said motor means comprising a pair of motors, the aforementioned means responsive to said engaged or disengaged relationship of said sensing elements and said path means comprising a control system for said motor means operative to normally effect propulsion coaction of said motors for propulsion in one direction and reversal of either of said motors while maintaining the other motor in the normally effected propulsion direction, to achieve rapid direction change of said device in following said path means.

13. In a device as set forth in claim 12, said control system comprising electrical relay means having contact means selectively engageable in response to said engaged or disengaged relationship of said sensing elements with said path means to effect said normal propulsion in said one direction and said reversal of either of said motors.

14. In a device as set forth in claim 13, said relay means comprising a relay for each motor, each relay having contact means normally engaged to effect respective motor propulsion in said one direction, and having normally open contact means engageable to effect reversal of the respective motor in response to said engaged or disengaged relationship of said sensing elements with said path means.

References Cited in the file of this patent

UNITED STATES PATENTS

| | | |
|---|---|---|
| 1,497,382 | Rollason | June 10, 1924 |
| 1,518,324 | Heaton | Dec. 9, 1924 |
| 2,054,644 | Wulfert | Sept. 15, 1936 |
| 2,068,403 | Ekstrom | Jan. 19, 1937 |
| 2,331,144 | Sitter | Oct. 5, 1943 |
| 2,488,464 | Arpin | Nov. 15, 1949 |
| 2,537,281 | Roshak | Jan. 9, 1951 |
| 2,690,626 | Gay | Oct. 5, 1954 |
| 2,691,946 | Marmo | Oct. 19, 1954 |
| 2,741,873 | Erickson | Apr. 17, 1956 |
| 2,742,099 | Hagen | Apr. 17, 1956 |
| 2,768,697 | Shotwell | Oct. 30, 1956 |
| 2,808,263 | Goldfinger | Oct. 1, 1957 |

FOREIGN PATENTS

| | | |
|---|---|---|
| 250,610 | Great Britain | Oct. 7, 1926 |